Aug. 17, 1965   V. K. LIPP   3,201,180
FLUID PRESSURE CONTROL SYSTEM
Filed March 15, 1963   5 Sheets-Sheet 1

INVENTOR.
VICTOR K. LIPP
BY
ATTORNEY

Aug. 17, 1965  V. K. LIPP  3,201,180
FLUID PRESSURE CONTROL SYSTEM
Filed March 15, 1963  5 Sheets-Sheet 3

INVENTOR.
VICTOR K. LIPP
BY
Strauch, Nolan & Neale
ATTORNEYS

Aug. 17, 1965  V. K. LIPP  3,201,180
FLUID PRESSURE CONTROL SYSTEM
Filed March 15, 1963  5 Sheets-Sheet 5

INVENTOR.
VICTOR K. LIPP
BY
Strauch, Nolan & Neale
ATTORNEYS

United States Patent Office 3,201,180
Patented Aug. 17, 1965

3,201,180
FLUID PRESSURE CONTROL SYSTEM
Victor K. Lipp, 12205 1st NW., Seattle 77, Wash.
Filed Mar. 15, 1963, Ser. No. 265,562
5 Claims. (Cl. 303—84)

This is a continuation-in-part of my co-pending application Serial No. 69,629, now abandoned, filed Nov. 16, 1960 for Unit Isolating Mechanism.

The present invention relates to fluid pressure control systems of the type which will simultaneously actuate several remote units from a single pressure supply station, such as the actuation of wheel cylinders in automotive brakes from a master cylinder operated by a pedal, and which will automatically isolate and deactivate the system with respect to any one or more of such units which may become defective. The invention is particularly applicable to automotive brake systems of the hydraulic type and will isolate and deactivate each individual brake in the hydraulic line of which a leak may develop.

In conventional hydraulic brake systems, the conduits to all the brakes are interconnected so that if a leak should develop in any one brake actuator, or brake conduit, the brake actuating liquid will be drained through such leak from the entire brake system. As a result, all the brakes of the vehicle operated by the foot brake pedal will become inoperative at the same time, which would create a very dangerous condition.

It is a principal object of the present invention to provide a novel control system for a multiple operating unit fluid system, such as an automotive hydraulic brake system, in which the conduits to the individual units are capable of being relatively independently isolated, although the actuating mechanism will exert pressure on the liquid in all of such conduits simultaneously and to the same degree in normal operation of the units. In case of a leak developing in any one conduit, it is an object to deactivate the unit corresponding to such conduit while continuing to enable actuating pressure to be exerted on the liquid in the individual conduits of all the other units, to effect continued operation of them.

It is also an object to enable any deactivated unit to be reactivated at least once for the purpose of confirming or temporarily repairing its defective character, so as not to jeopardize the operability of the other units in the system. Upon recurrence of the defective condition that unit will be permanently inactivated until it is repaired.

A further object is to enable liquid to be supplied from a single source to all the conduits of such an actuating system even though during operation the individual units normally will be isolated from each other as to intercommunication between their fluid conduits.

In connection with the automatic unit isolating mechanism it is also an object to provide a warning to the operator of failure of a unit when it occurs so that he will be able to detect readily which particular unit, or units, have failed and been deactivated.

Another object of the present invention is to enable it to be applied with minor modifications to systems having any number of separate units operated from a single source.

It is a further object to provide such actuating mechanism which can be installed in a conventional hydraulic system with a minimum amount of modification of such system so that such mechanism can be sold as an auxiliary attachment, or accessory which can be installed quite readily in existing systems.

While the principal invention is illustrated as being applied to an automotive hydraulic brake system, it is an object to utilize the invention in various types of fluid-actuated systems including a plurality of units receiving pressure from a single source.

The mechanism of the present invention is particularly desirable for use on heavy vehicles such as buses, trucks and trailers and the foregoing objects can be accomplished by providing between the master cylinder conduit and the individual brake conduits a brake-isolating header, or distribution device, in which a plunger is interposed in each brake line to transmit actuating pressure to the liquid in each respective brake conduit. Associated with such distribution device is a reconditioning device for by-passing the individual brake line plungers to supply sufficient liquid directly to such brake lines to restore them to operating condition. If the travel of an isolating plunger exceeds the normal range of movement such plunger will close a switch in a warning and signalling system visible to the vehicle operator to warn him of the defective character of that particular brake.

Further objects of the invention will presently appear as the description proceeds in connection with the appended claims and the annexed drawings wherein

FIGURE 16 is a wiring diagram of the warning and signal system in this embodiment In the embodiment of FIGURE 1 a typical truck or bus hydraulic brake system is shown diagrammatically including six wheel brake units, brake actuating mechanism for such units and the brake isolating distribution device of the present invention interposed between such actuating mechanism and the individual brake units. Each brake unit 1 has the usual hydraulic wheel cylinder arrangement for actuating the brake shoes and is connected to the remainder of the system by a conventional hydraulic liquid supply conduit 2. A fitting 3 is supplied at each brake for the purpose of venting or bleeding air from the brake line. Actuation of the brakes is effected by depressing the brake pedal 4 carried by rock shaft 5, turning of which swings arm 6 to move inwardly the plunger rod 7 of the usual master hydraulic cylinder 8. Such movement expels liquid from the master cylinder into the liquid pressure line 9 and the portion of the system incorporating the present invention, and excess fluid may be returned from the portion of the system including the present invention through the return conduit 10 to the master cylinder 8.

Figures 1, 2, 6:
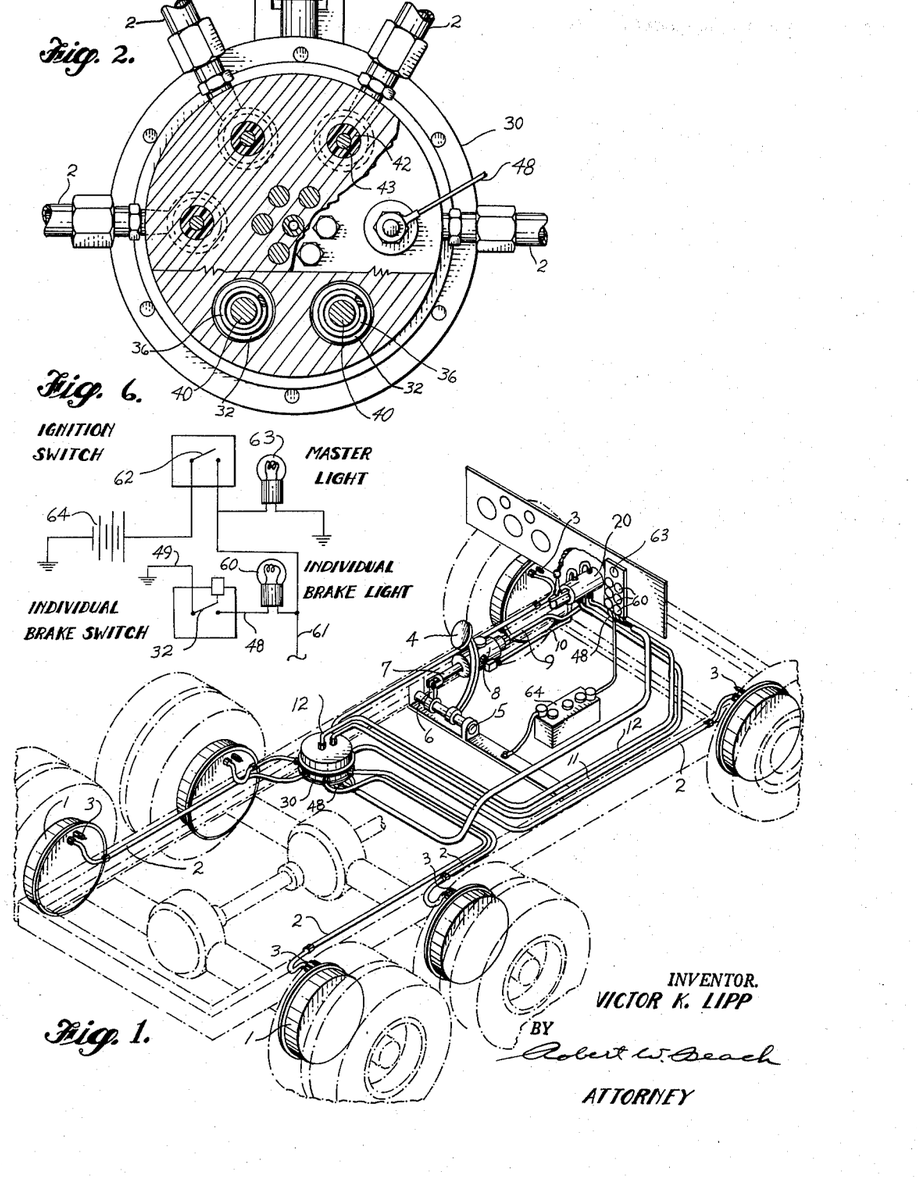
FIGURE 1 is a diagrammatic top perspective view of a representative hydraulic brake system incorporating the present invention, with parts broken away.
FIGURE 2 is a bottom plan view of the distribution device of the mechanism in which parts have been broken away and shown in section.
FIGURE 6 is a wiring diagram of a signal system for the foregoing embodiment of the invention.

The supply conduit 9 and the return conduit 10 are connected to the reconditioning devce 20 which is shown as being mounted in a position readily accessible to the vehicle operator. Such reconditioning device is connected by the conduits 11 and 12 to the distribution device 30. To such distribution device is connected the various individual brake conduits 2. It is preferred that such distribution device be located in a position as nearly as possible equidistant from all the individual brakes, or other operating units to be controlled, so that pressure exerted on the fluid in the various distribution lines will be equal and will effect simultaneous operation of the several brakes in response to manipulation of the brake pedal 4. It is not necessary that such distribution unit be accessible to the vehicle operator, and its is desirable for the lines 11 and 12 to be as short as possible and protected to prevent damage to them. If the distribution mechanism should become inoperative because of a leak or failure occurring in line 11, all of the brake units would be rendered inoperative.

Figure 3:
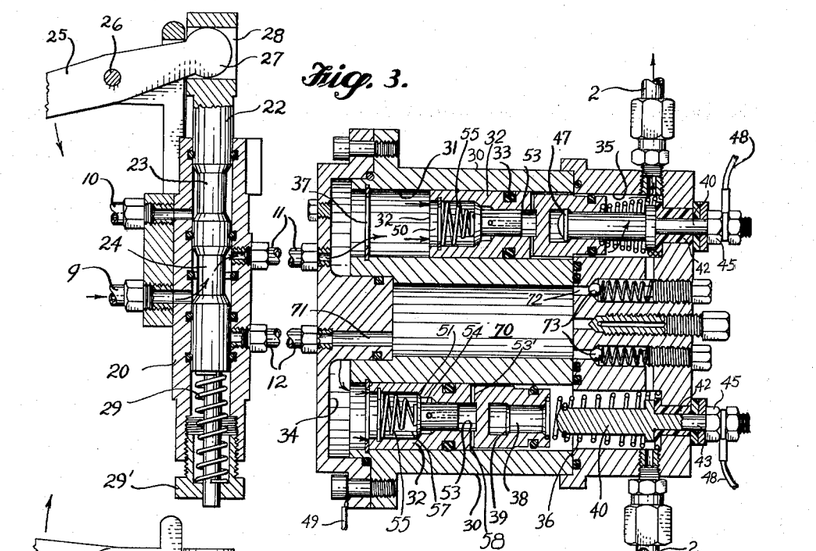
FIGURE 3 is a longitudinal sectional view through the reconditioning device and an axial sectional view through the distribution device which are interconnected and in which the parts are shown in brake-operating position with one brake deactivated.

The principal function of the distribution device 30 is to isolate the master cylinder 8 hydraulically from the individual brake conduits 2 while preserving coordination in normal operation. The structural details of distribution device 30 are shown in FIGURES 2, 3, 4 and 5. FIGURE 3 shows the parts of the distribution device in condition for brake operation, but certain parts are illustrated in positions to deactivate one of the individual brake units. The casing of the distribution device has in it bores 31 corresponding in number to the number of individual units which will be controlled through the distribution device. In each of these bores is slidably received an isolating piston or plunger 32 and each plunger is sealed relatve to the bore by an O-ring 33 fitted in an annular groove in the wall of the plunger. The several bores are in communication with each other through the chamber 34 in one end of the distribution device casing with which chamber the normal supply pipe 11 communicates.

The end of each bore 31 opposite the header chamber 34 is connected to a separate brake line 2 leading to a wheel cylinder. Within the chamber 35 of each bore to which a brake line is connected is a compression spring 36 reacting between one end of a plunger 32 and the adjacent end of the chamber 35. The end of plunger 32 has a suitable recess in which the end of spring 36 seats to maintain it centered. Normally, when the brakes are not being actuated the spring 36 will urge plungers 32 to the left, as shown in FIGURE 3, to engage their left ends with stops in the form of rings 37 fitted in grooves in the bores.

It will be seen that each plunger 32 forming a seal with the wall of its bore 31 will separate the fluid in the brake line 2 and chamber 35 from the fluid in the left end of bore 31, header chamber 34 and fluid supply line 11. Even though a leak should occur in one of the lines 2, therefore, only the fluid in that line and to the right of piston 32 in FIGURE 3 could escape from such leak. No fluid from the left end of the bore, header chamber 34, any other bore, or supply line 11, could escape from such leak because of the blocking, or isolating action of plunger 32. Any pressure exerted by the fluid in the supply line 11 will, however, be transmitted equally through the header space 34 to all of the plungers 32 and these plungers will be moved correspondingly against the resistance of springs 36 to transmit proportional pressure to the fluid in bore chambers 35 and individual brake lines 2.

In FIGURE 3, lower plunger 32 is shown in the position in which it would occupy when little or no pressure is being exerted by fluid in the supply line 11 and chamber 34. The upper plunger 32 in FIGURE 3, however, is shown in its extreme position to the right. It is preferred that provision be made to retain plunger 32 in such extreme right position when the unit corresponding to that plunger has failed because fluid in that unit line has been depleted a predetermined amount below the normal fluctuation of the fluid in chamber 35 resulting from operaton of the brake unit. Moreover, in normal operation of the brakes, it is not necessary for a plunger 32 to travel in a bore 31 as far as shown in the upper portion of FIGURE 3, or even as far as shown in the upper portion of FIGURE 4. It is desirable for the vehicle operator to receive a warning when a plunger 32 has travelled a distance greater than normal to the right, and the structure provided serves the double function of providing a warning under such circumstances and of locking the plunger in its position farthest to the right, as shown in the upper portion of FIGURE 3, when the plunger travel is excessive.

Figures 4, 5:
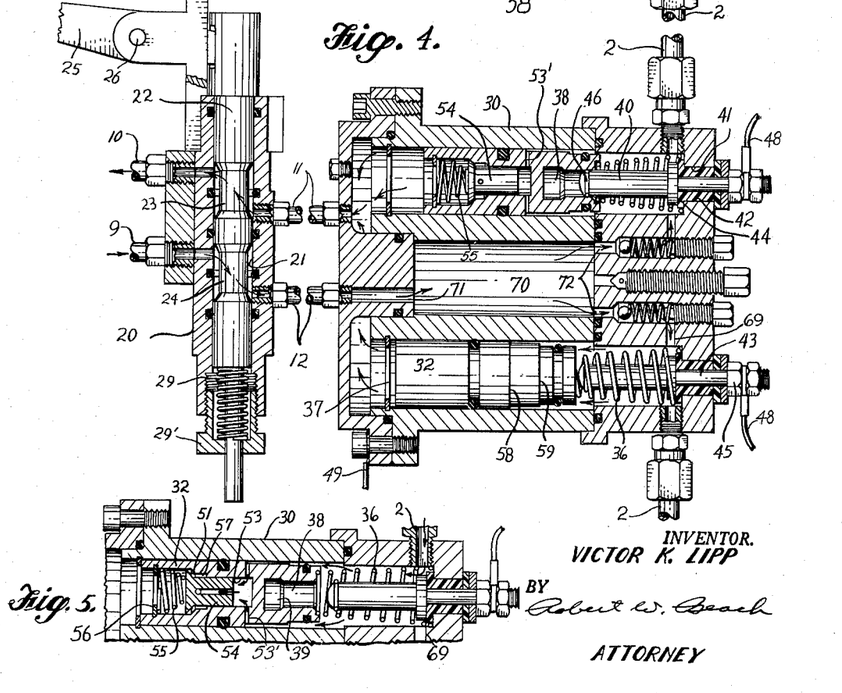
FIGURE 4 is a sectional view similar to FIGURE 3 but with the parts in reconditioning position.
FIGURE 5 is a fragmentary axial sectional view through one portion of the distribution device showing the action of the relief valve of FIGURES 3 and 4.

A cavity 38 is formed in the right end of each plunger 32 and the inner portion of such cavity is undercut to provide a shoulder 39 facing toward the closed end of such cavity. Moreover, the opening of such cavity is flared. A fixed post 40 projecting lengthwise of the bore 31 is anchored in the right end of the distribution device, as shown in FIGURES 3 and 4. Such end of the distribution device has in it holes corresponding in number and arrangement to the bores 31. A flanged insulating bushing 42 is fitted in each of the holes 41, and a supporting stem portion 43 of a post 40 extends through the aperture of each such bushing. Each post has a shoulder 44 formed at the end of stem 43 which bears on an end flange of the bushing 41. The stem is secured in place in the bushing aperture by a nut 45 screwed on the threaded end of each stem 43.

The end of each post 40 farthest from its supported end has in it an annular groove 46, in which is fitted a contractable split ring 47. The groove is sufficiently deep so that such ring can be resiliently contracted into the groove substantially flush with the outer surface of the post. Moreover, post 40 will be of a size and shape in cross section corresponding to the size and shape of the smaller portion of cavity 38 so that such post may be slidably received within such portion of the cavity. The flared portion of such cavity will exert a contracting action on the split ring 47 so that such ring will be pressed inwardly into groove 46 as the post slides into the cavity so that such split ring will not prevent movement of the post end through the reduced portion of the cavity.

For signalling purposes, an electric wire 48 is secured to the anchored end of each post 40. Another electrical connection 49 may be made to the body of the distribution device. As long as the post 40, and its associated parts, does not touch any other part of such device except the insulating bushing 41, the electric circuit through the conductors 48 and 49 will remain open. If the post 40 and the plunger 32 are of conducting material, such as metal, however, a circuit will be completed between the conductors 48 and 49 as soon as the plunger moves to the right far enough so that the entrance to its cavity 38 engages the end of the post 40. Such contact will be maintained as the plunger slides along the post. If the plunger slides to the right sufficiently far in bore 31 so that the split ring 47 passes beyond the shoulder 39 into the enlarged portion of the cavity, the split ring 47 will expand in such enlarged portion. Engagement of such split ring with the shoulder will effect great resistance to return of the plunger to the left in the bore 31. In fact, the resistance will be so great that the force which can be exerted by spring 36 even in the compressed position shown in the upper portion of FIGURE 3, will be insufficient to return the plunger to the left and such plunger will therefore remain locked in the position shown in FIGURE 3.

In FIGURE 2, the arrangement of the posts 40 for the six brake unit system of FIGURE 1 is shown. For each of such brake units a signal can be provided, such as a light 60. These light can be mounted in a suitable cluster on the instrument board of the vehicle, as shown in FIGURE 1. One terminal of each of these lights is connected to the wire 48 of the post 40 corresponding to the brake unit to which the conduit 2 communicating with the chamber 35 for that post is connected. The other terminal of each light is connected to a wire 61 common to all the lights 60 so that they will be connected in parallel. This wire also is connected to a master light 63 which will be illuminated whenever the switch 62 is closed. These lights can be energized by a suitable power source 64, such as the usual battery of the automotive vehicle.

When there is sufficient leakage from a brake line 2 so that when pressure is applied to the liquid in conduit 11 for the purpose of operating the brakes, a plunger 32 moves far enough to the right so that it will engage post 40, the corresponding light 60 will be energized. Such light will remain energized as long as pressure in the brake system is being supplied sufficient to hold the plunger in contact with the post. Actually, the leak in a particular brake line 2 may be very small so that it will take a long time for sufficient liquid to be lost to enable the plunger 32 to move into engagement with its rod 40. Under such circumstances repair of the leak can be deferred if there is provision for reactivating the particular brake unit by refilling it with actuating liquid to its initial condition. Such operation is made possible by including the reactivating, or reconditioning, device 20 and cooperating structure in the distribution device 30 in the system.

Any particular brake unit is reconditioned, or reactivated, by refilling it with liquid. Since, as explained above, each plunger 32 effects a seal as to the opposite end of the bore 31 in which it is received, it is not possible for liquid in a particular brake line 2 to be replenished through the length of a bore 31 unless such liquid flows through the plunger itself. It is preferred that reconditioning liquid be supplied to a brake conduit 2, therefore, through a by-pass passage circumventing the bore 31 of each brake unit. Replenishing liquid is supplied to each brake unit through a by-pass passage in the distribution device for each brake unit.

Preferably, the distribution device 30 is, as shown in FIGURE 2, of circular cross section and the several plunger accommodating bores 31 are arranged in a circle concentric with the casing of the distribution unit. The central portion of such unit has in it a chamber 70 with which the conduit 12 communicates through a bore 71 in the left end of the distribution device, as shown in FIGURES 3 and 4. From the right end of this chamber, as seen in these figures, extend outlet passages 72, each one of which is connected by a passage 69 to one of the brake unit chambers 35 and associated conduit 2. A check valve 73 is provided in each of these passages to prevent liquid from being forced from the chambers 35 through the passages 72 into the chamber 70 when pressure is exerted on the liquid in such chambers by movement of the plungers 32 to the right, as seen in FIGURES 3 and 4, effected by the pressure of the liquid in the bores 31 produced by the pressure of liquid in the supply conduit 11.

The liquid in all of the brake lines 2 and chambers 35 can be replenished as necessary, or supplied initially from the central chamber 70 through the passages 72 and 69 past the check valves 73, by exerting pressure on the liquid in the chamber 70. During such liquid replenishing operation all of the fittings 3 may be opened to vent the several brake lines to allow air to escape from them. Each of these fittings will then be closed when liquid starts to be discharged from it. Liquid under pressure supplied from the chamber 70, not only will fill each of the brake lines 2, but in entering the chambers 35 will exert pressure on the right ends of plungers 32 supplementing the force of springs 36 to move such plungers fully to the left into engagement with their respective stop rings 37, and thus completely fill the chambers 35. The force of such liquid under pressure in combination with the force of a spring 36 should not, however, be great enough to release from its latched position a plunger 32 in the condition of that shown at the top of FIGURE 3, where the split ring 47 of post 40 has expanded within the enlarged portion of the plunger cavity 38, but high fluid pressure will release it.

Pressure may be exerted on the liquid in the supply chamber 70 of the distribution device 30 in various ways. It would be possible to provide in such cavity a piston which could be moved farther into the cavity by any suitable mechanism to exert pressure on the liquid in it. It may be preferred, however, that such pressure be created by remote control apparatus and that such apparatus be capable of supplying additional liquid to such cavity if necessary. Such remote control apparatus should be accessible to the vehicle operator while the vehicle is in operation, so that if a warning light 60 is illuminated indicating that the liquid in the brake line is low, the operator may effect a replenishing operation in an attempt to restore such brake to normal operating condition if the leakage from its brake line is not so great that its plunger 32 has been locked out of service.

In order to insure that the reconditioning operation is to be effective, care must be taken that no pressure is being exerted on the liquid in the brake lines by the plungers 32. Consequently, it is desirable to interrupt the flow of liquid under pressure through the supply line 11 to the header chamber 34 at the time a reconditioning operation is to be effected. Furthermore, to simplify the mechanism for exerting pressure on the liquid in the chamber 70, it is preferred that the master cylinder be arranged to produce such pressure by manipulation of the foot brake pedal 4. Consequently, the reconditioning device 20, as shown in FIGURES 3 and 4, includes a casing having a cylindrical bore 21 extending through it. Within this bore is slidably fitted a valve rod 22, which has annular grooves 23 and 24 spaced lengthwise of it corresponding to the spacing between the connections 9 and 10 to one side of the reconditioning device from the master cylinder. As shown in FIGURES 3 and 4, the conduits 11 and 12 are connected to the casing of the reconditioning device 20 spaced apart approximately the same distance as the connections of the conduits 9 and 10, but the connections of the conduits 11 and 12 are displaced lengthwise of the reconditioning device from the conduits 9 and 10 to locate the connection for conduit 11 approximately midway between the connections of the conduits 9 and 10.

It is immaterial how far apart the connections of conduits 9 and 10 and of conduits 11 and 12 to the reconditioning device are, but the spacing of such conduits should be equal and the width of the groove 23 must be sufficient to bridge between conduits 10 and 11, as shown in FIGURE 4, and the width of the groove 24 must be great enough to bridge between conduits 9 and 12, as shown in FIGURE 4, or conduits 9 and 11, as shown in FIGURE 3. The valve rod 22 can be slid lengthwise of the reconditioning device by a lever 25 swingably mounted by pivot 26 on the reconditioning device. The short end 27 of the lever is engaged in a slot 28 in one end of the rod 22 and the opposite, longer end of the lever constitutes a handle which may be grasped by the operator to swing the lever. The rod 22 is urged toward the position shown in FIGURE 3 by the compression spring 29 inter-engaged between the end of the rod remote from lever 25 and a cap 29' screwed in and closing the end of the reconditioning device casing which serves as an end bearing for the spring.

When the rod 22 is maintained in the position shown in FIGURE 3 by the spring 29, the groove 24 is arranged to bridge between the fluid supply conduit 9 connected to the master cylinder 8 and conduit 11 connected to the header chamber 34 for the several plungers 32. When the brake pedal 4 is depressed to move piston rod 7 into the master cylinder 8, therefore, hydraulic fluid under master cylinder pressure will be forced from such master cylinder through conduit 9, groove 4, conduit 11 and header chamber 34 into the several bores 31 corresponding to the individual brakes. Such supply of liquid under pressure will force all of the plungers 32 to the right to effect normal application of the brakes. When the brake pedal is released the several springs 36 will push their corresponding plungers 32 back to the left for returning the liquid from the header chamber 34 through the conduit 11, groove 24 and conduit 9 to the master cylinder. During this normal operation, the conduit 10 does not communicate through groove 23 with any other conduit and no conduit is in communication through the reconditioning device with conduit 12.

If a warning brake light 60 is illuminated during such a brake actuating operation, indicating that liquid has leaked out of the corresponding brake unit line to a greater or lesser extent, the operator can release the pressure on the foot brake pedal 4, pull lever 25 from the position of FIGURE 3 to the position of FIGURE 4, and again depress the brake pedal 4 while the lever is held in this position. Such shifting of the lever, as shown in FIGURE 4, will move groove 23 into a position establishing communication between conduit 11 and conduit 10 and groove 24 into a position establishing communication between conduit 9 and conduit 12. With the valve rod in this position the supply of fluid under master cylinder pressure through conduit 9 provided by depression of the brake pedal 4 will be transmitted through pipe 12 to chamber 70 for filling the several brake lines 2 and chambers 35 with liquid instead of such liquid being supplied through conduit 11 to the header chamber 34. On the contrary, such header chamber will be vented through conduit 11, groove 23 and conduit 10 because conduit 10 is connected to an unpressurized reservoir portion of the master cylinder 8. After such liquid replenishing operation, the pressure on brake pedal 4 will be released and the operator will release lever 25 so that spring 29 can shift the valve rod 22 from the position of FIGURE 4 to the normal brake operating position of FIGURE 3 to restore the parts of the system to brake-operating condition.

Because of the interposition in the brake system of the plungers 32 between the individual brake units and the master cylinders 8, there would not be any way of compensating for an increase in volume of the liquid in the individual brake lines caused by a rise in atmospheric temperature unless some special provision were made for escape of liquid. It is undesirable to provide simply an excess pressure relief port in each brake line because flow of liquid from such a relief port would cause liquid to be lost and wasted. Consequently, it is preferred to provide a pressure relief valve controlled by-pass from each individual conduit to the master cylinder to relieve excessive pressure conditions in the individual brake lines so that no liquid will be lost from the system. Such by-pass valves for the individual brake lines may conveniently be provided in each of the plungers 32 themselves.

In the left end of each plunger 32 is a cavity 50 having spaced from its opening a shoulder 51 constituting a valve seat. Beyond such valve seat is a bore 53 in the plunger in which the stem of a valve 54 is slidably received. The head of this valve will seat on the valve seat ledge 51 and the valve is pressed into such seated position normally by a compression spring 55 received in the cavity 50 and bearing against a split ring 56 seated in an inwardly opening annular groove within the cavity 50 adjacent to its opening. The valve stem has a longitudinal bore communicating with lateral bores in the valve stem for establishing communication between the plunger bore 53 and an annular recess 57 in the plunger adjacent to the valve seat shoulder 51. In order to provide an escape passage for liquid under excessive pressure from a chamber 35 past the relief valve 54 of its plunger, it is necessary to provide a passage between the chamber 35 and the plunger bore 53. For this purpose, a step 58 is provided in the plunger wall to afford clearance between the portion of the plunger body beyond the step and the wall of bore 31. A second step 59 may be provided to reduce farther the end portion of the plunger so that it can enter the chamber 35. Engagement of the shoulder 59 with a step at the junction of chamber 35 with bore 31 will limit movement of the plunger to the right in the position shown in the upper portion of FIGURE 3 without danger of exerting excessive stress on the spring 36. Passages 53' extending radially through the plunger 32 complete the communication between the annular space around the end of the plunger reduced by the shoulders 58 and 59 and the plunger bore 53.

In the event that excessive pressure should be developed in a brake line 2 when the brake is not being operated, the liquid from the brake line will pass through chamber 35 around the reduced right end portion of the plunger 32 through apertures 53' to the plunger bore 53 and thence through the passages within the valve 54 and the annular space 57 past the valve seat 51. The excessive pressure will act on the right end of the valve under such circumstances to shift it to the left relative to the plunger 32 for moving the valve off its seat, as shown in FIGURE 5. Such liquid as must be removed to relieve the excessive pressure which escapes past the valve 54 will simply flow through the bore 31, header chamber 34 and conduits 11 and 9 back to the master cylinder. As soon as the excessive pressure in any brake line is relieved in this manner, the spring 55 will again press valve 54 against its seat 51 to prevent further passage of liquid past the valve. If so much liquid has thus escaped from any one or more of the conduits 2 so that a warning light, or lights 60, are illuminated when the brakes are applied during normal operation of the vehicle, the lever 25 can be swung from the position of FIGURE 3 to that of FIGURE 4 and a replenishing operation performed by depression of the brake pedal 4 to replace in the individual brake lines liquid which has thus escaped from them under high temperature conditions.

FIGURES 7–16 illustrate a further embodiment of the invention as applied to a vehicle having twelve braking units, as a six wheel tractor or truck coupled in tandem to a six wheel trailer.

A single master control valve 100 is actuated by a pivoted foot pedal 101 available to the vehicle operator. Valve 100 is connected by conduit 102 to a reservoir 103 wherein air is maintained at a desired high pressure by compressor 104. Air under pressure, when valve 100 is opened by rocking pedal 101 clockwise, passes through conduit 105 to an isolation control assembly designated at 106 in FIGURE 7 and shown in greater detail in FIGURES 8–11.

Figure 7:
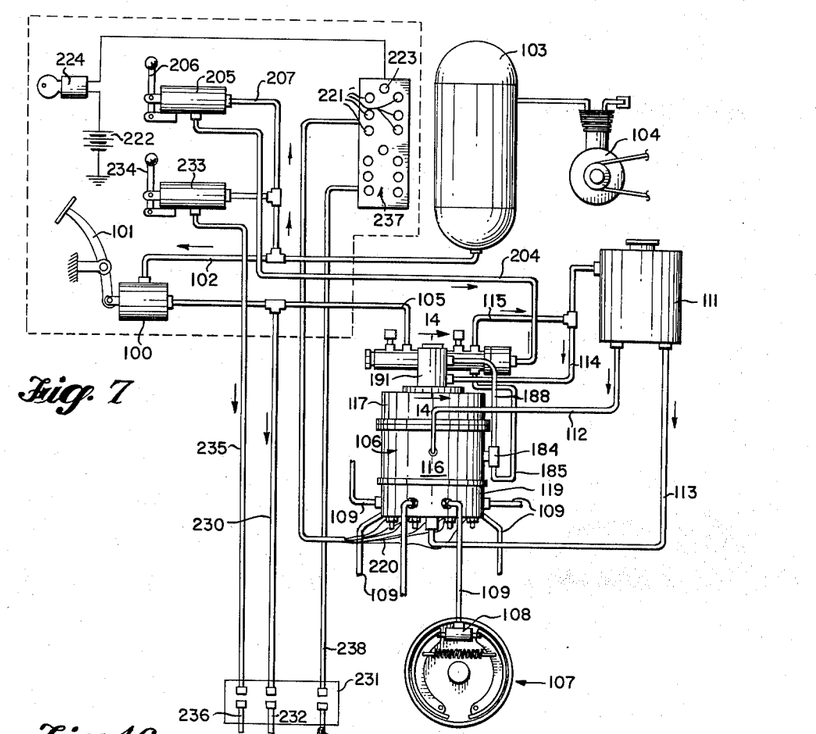
FIGURE 7 is a diagrammatic view showing a further embodiment of the invention as applied to a six wheel truck and six wheel trailer combination, wherein the primary actuation is pneumatic and the reconditioning and distribution devices are incorporated substantially in a single assembly.

FIGURE 7 shows one of the six wheel brake assemblies 107 of the truck or tractor having a hydraulic wheel cylinder 108 for actuating the brake shoes connected by conduit 109 to the control assembly 106. Six of these hydraulic liquid conduits 109 are shown in FIGURE 7 and each is connected to a wheel assembly 107.

A reservoir of hydraulic liquid is provided at 111 connected by conduit 112 to supply by gravity hydraulic liquid into the control assembly 106 for normal operation, and connected by conduit 113 to supply liquid in bypass relation to control assembly 106 for reconditioning as will appear. Two hydraulic liquid return conduits 114 and 115 are provided between control assembly 106 and reservoir 111 for a purpose to appear.

Figures 8, 9, 10, 11:
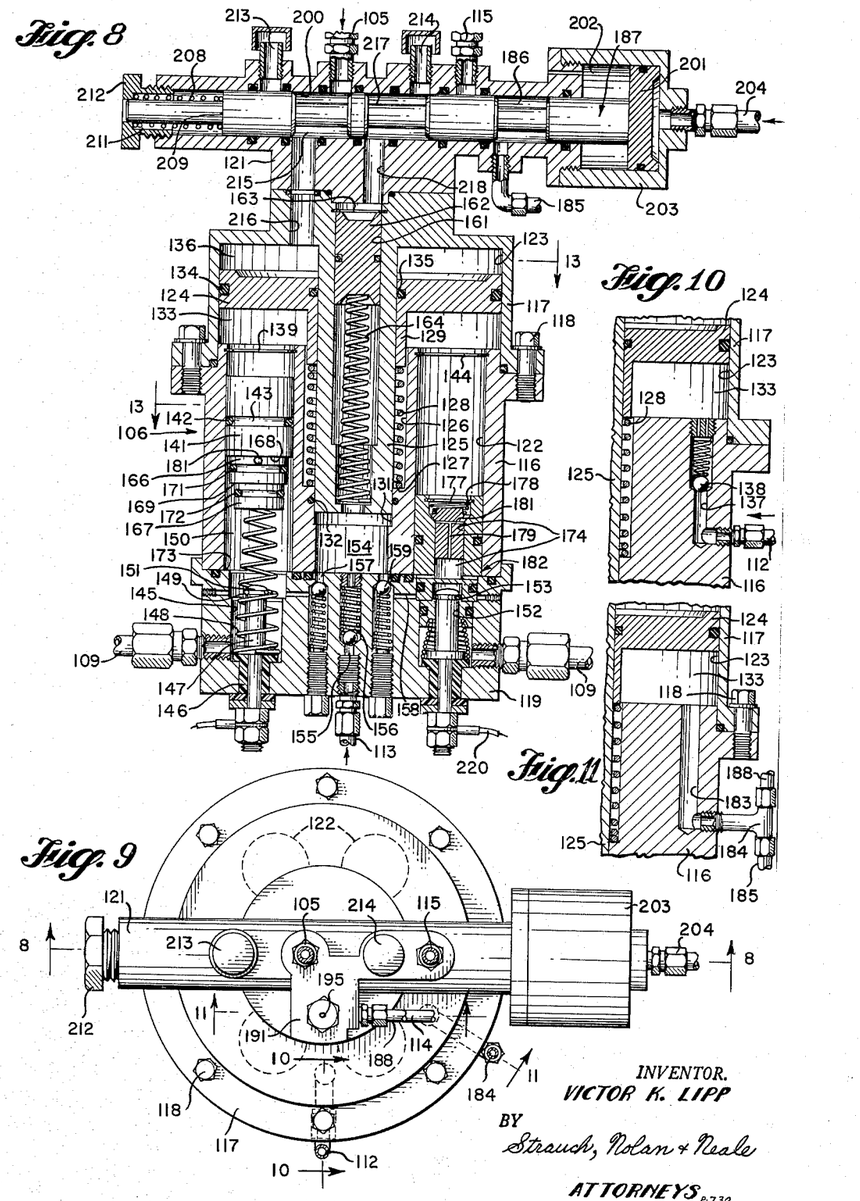
FIGURE 8 is a section through the combination reconditioning and distribution assembly substantially along line 8—8 of FIGURE 9 showing internal details.
FIGURE 9 is a top plan view of the combination assembly of FIGURE 8.
FIGURE 10 is a fragmentary section substantially on line 10—10 of FIGURE 9 showing the unidirectional passage for liquid supply to the actuator cylinder.
FIGURE 11 is a fragmentary section on line 11—11 in FIGURE 9 showing the excess liquid discharge passage from the actuator cylinder.

Referring now to FIGURE 8 the control assembly 106 embodies in a single housing a reconditioning device analogous to that at 20 of FIGURE 3 and a distribution device analogous to that at 30 in FIGURE 3.

The distribution device comprises a housing body member 116 having an inlet housing end member 117 secured to the body as by bolts 118, and an outlet housing end member 119 suitably rigidly secured to body 116. Members 116, 117, 118 constitute the distribution device housing, and the reconditioning device comprises a tubular housing 121 suitably rigidly secured to end housing member 117.

Body 116 is formed internally with a series of equally circumferentially distributed cylindrical through bores 122, here six in number corresponding to the number of brake conduits 109. All of bores 122 open at one end into a cylinder 123 formed in end member 117 and slidably containing a reciprocable annular floating actuator piston 124.

The inner cylindrical periphery of piston 124 is slidably mounted on a fixed post 125 integral with end member 117 and projecting freely through central body bore 126. Bore 126 is formed with an internal shoulder 127, and in the bore a coiled compression spring 128 surrounding the post extends between fixed shoulder 127 and the adjacent hub 129 of piston 124.

Beyond shoulder 127, bore 126 is reduced to provide a section 131 which snugly receives the end of post 125, and a fluid tight static seal such as an O-ring 132 is provided between post 125 and the bore wall.

Cylinder space 133 on one side of piston 124 is a hydraulic liquid space, and suitable peripheral seals such as O-rings 134 and 135 on the piston 124 maintain liquid space 133 fluid tight with respect to a compressed air space 136 on the other side of the piston.

Hydraulic liquid enters the cylinder space 133 from conduit 112 through body side passage 137 (FIGURE 10) which contains a unidirectional check valve unit 138 that permits flow only into space 133 and blocks return flow of liquid. The gravity head supplied by the location of reservoir 111 is adequate to keep space 133 with liquid, although a pump may be provided if needed.

The liquid in space 133 also fills the adjacent end spaces 139 of bores 122, and each bore 133 slidably contains an isolating piston 141 that corresponds to pistons 32 of FIGURE 3. A suitable seal such as O-ring 142 in a piston groove 143 provides a fluid tight seal. A suitable annular snap ring 144 disposed at the end of each bore 122 limits piston movement toward space 133.

End member 119 is formed with a series of bores 145 each aligned with a body bore 122 and into which bores 145 the respective brake conduits 109 open. These communicating bores define a liquid displacement space 150 on this side of each piston 141.

The end of each bore 145 is closed by an electrical contact assembly comprising an insulating sleeve and washer assembly 146 mounting a rigid metal post 147. A coiled compression spring 148 extends through aligned bores 122 and 145 between the end of piston 141 and the bottom of bore 145.

The inner tip of each contact post 147 carries a resilient snap ring abutment 149 in a groove 151, and the adjacent end of each piston 141 is formed with an axially open recess 152 having an enlarged section defining an internal shoulder 153. The dimensions of ring 149 and recess 152 are such that if piston 141 moves to the position shown at the right in FIGURE 8 the end of the post containing compressed ring 149 will slide through recess 152 until ring 149 is free to expand in the enlarged section and latch behind shoulder 153 and prevent return movement of piston 141 by spring 148 alone. This action is essentially the same as that whereby piston 32 is latched on post 40 in FIGURE 3.

The central body bore is formed beyond the end of post 125 with a hydraulic liquid reconditioning space 154 that is supplied with liquid through an inlet passage 155 connected to conduit 113 and containing a suitable unidirectional check valve assembly 156 that blocks return flow toward conduit 113.

Space 154 is individually connected to each space 150 by a series of axial ports 157 communicating with radial ports 158 leading into bores 145. A suitable unidirectional check valve 159 is mounted at the juncture of each pair of ports 157 and 158, so that hydraulic fluid may flow only from space 154 into space 150 and return flow from space 150 is blocked.

Internally post 125 is formed with a cylinder 161 open to reconditioning space 154 and in which is slidably mounted a piston 162 that is spring biased into abutment with a fixed annular stop ring 163 by a compression spring 164 seated on cylinder shoulder 165. It will be seen that displacement of piston 162 downwardly in FIGURE 8 will displace liquid through space 154 and ports 157 and 158 for a purpose to appear.

As shown in FIGURE 8 each piston 141 is stepped, providing successively reduced cylindrical sections 166 and 167 forming axially facing shoulders 168 and 169, and axially spaced seals such as O-rings 171 and 172 are provided in grooves on the respective reduced sections. Also it will be noted that bores 145 are each formed with an internal shoulder 173 adjacent their junction with bores 122 which in the extended position of the piston shown at the right in FIGURE 8 is adapted to serve as a stop coacting with piston shoulder 168 to limit movement of the piston toward the brake applying position.

Each isolating piston 141 is formed with a central bore 174 provided at one end with a valve seat 175 coacting with a valve element 176 slidably mounted in bore 174 and biased by compression spring 177 seated on abutment 178 toward valve seat 175. Valve element 176 is formed with an axial passage 179 connecting with radial passages 181, and a plurality of radial passages 182 in piston section 165 extend into the bottom of bore 174.

As shown in the right side of FIGURE 8, when the piston 141 is in the latched position the piston 141 is effective to block any flow of fluid through bores 158 and 174.

When a brake conduit 109 has ruptured and piston 141 has been latched as shown in section at the right side of FIGURE 8, it will be noted that the associated radial port 158 through which the reconditioning liquid flows into a space 150 is now blocked at its outer end by the reduced lower end 167 of piston 141 fitting snugly into bore 145 and cooperating seals such as O-rings 226 and 227 on the piston, so that no reconditioning liquid is lost into an open or ruptured conduit 109.

Figures 12, 14, 15:
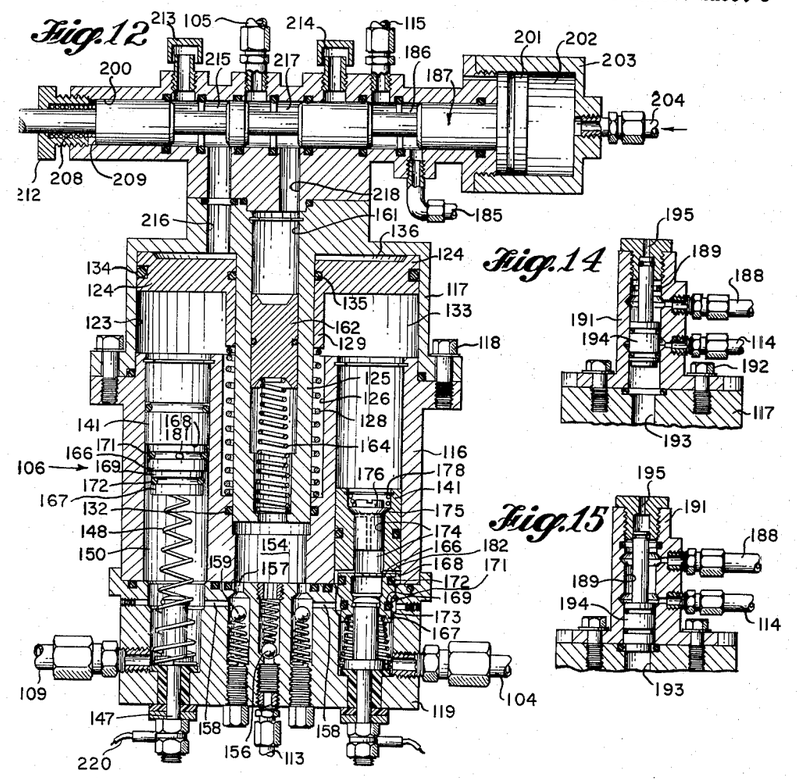
FIGURE 12 is a sectional view similar to FIGURE 8 but showing the parts in position for reconditioning.
FIGURE 14 is a fragmentary section substantially on line 14—14 of FIGURE 7 showing the temperature compensation valve.
FIGURE 15 is a section like FIGURE 14 but showing the valve in displaced position.
Figure 13:
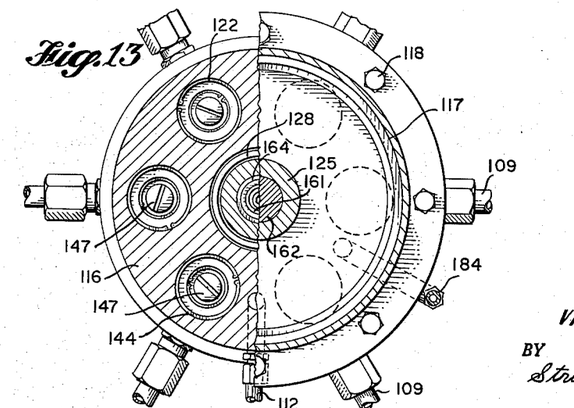
FIGURE 13 is a top plan view partly broken away and in section substantially along line 13—13 of FIGURE 8 showing internal structural detail.

The return path of hydraulic liquid from space 133 is through body passage 183 (FIGURE 11) to T-fitting 184 from which one conduit 185 is connected to annular valve passage 186 in the reconditioning housing, and condiut 115 which in the FIGURE 12 position of the reconditioning valve spool 187 is connected to chamber 186 leads back to the reservoir 111.

Referring now to FIGURES 7, 14 and 15, the other branch conduit 188 from T-fitting 184 opens into the bore 189 of a relief valve housing 191 secured on end member 117 as by bolts 192. Bore 189 is connected by internal passage 193 to air space 136 and contains a slidable relief valve element 194 which in normal operation with air pressure in space 136 is located as shown in FIGURE 14 to block communication between bore 189 and conduit 114 leading back to reservoir 111. The outer end of bore 189 is vented at 195. FIGURE 15 shows the position of valve 194 when little or no air pressure exists in space 136, and under this condition the conduits 188 and 114 are connected through bore 189 to provide a complete return passage from liquid space 133 to the reservoir 111.

As shown in FIGURE 8 the reconditioning housing 121 has a longitudinal through bore 200 wherein spool valve 187 is slidable. At one end valve 187 extends into abutment with a selector piston 201 slidable in a cylinder 202 formed by a casing 203 threadedly mounted on the end of housing 121. At its outer end cylinder 202 is in communication with an air pressure outlet conduit 204 of a selector valve 205 having an operating handle 206. The inlet conduit 207 to valve 205 is connected to air reservoir 103, so that when valve 205 is opened by movement of handle 206 air pressure is applied through conduit 204 to shift the valve spool 187 from the FIGURE 8 position to the FIGURE 12 position.

At its other end spool valve 187 is abutted by a resilient stop in the form of a coiled compression spring 208 extending between an axial valve shoulder 209 and an internal shoulder 211 on a threaded adjustable element 212. Spring 208 biases spool valve 187 to the FIGURE 8 position.

Air exhaust ports 213 and 214 lead out from spool valve bore 200. When spool valve 187 is in the FIGURE 8 position the annular valve passage 215 connects inlet air conduit 105 to a housing passage 216 leading into actuator cylinder space 136 for normal brake actuation. Under this condition air exhaust port 213 is blocked, air exhaust port 214 is connected by annular valve passage 217 and housing passage 218 to cylinder 161 at the upper (air) side of piston 162, air exhaust port 214 is blocked and annular passage 186 is connected to conduit 185.

When the operator depresses pedal 101 air under pressure passes through conduit 105, annular valve passage 215, and housing passage 216 to enter cylinder space 136 and displace actuator piston 124 downwardly in FIGURE 8. Since cylinder space 133 and the adjacent ends of bores 122 are filled with hydraulic liquid, this results in simultaneous displacement of all of the isolating pistons 141, and since the bores 122 below pistons 141 and the brake conduits 109 are all filled with hydraulic liquid this results in displacement of that liquid through the brake conduits to actuate all of the wheel cylinders 108.

Only a small displacement of pistons 141 is needed in normal brake operation, and during such operation the metal pistons 141 do not contact posts 147.

When the operator takes his foot off pedal 101, the valve 100 closes with suitable exhaust of air pressure from conduit 105, spring 128 expands to force piston 124 upwardly in FIGURE 8, and springs 148 expand to force pistons 141 upwardly in FIGURE 8 thereby relieving the pressure in the brake conduits 109 and releasing the brakes.

The foregoing is normal brake operation with no loss of liquid in the conduit system between distribution device 106 and the wheels. Reservoir 111 keeps cylinder space 133 and the bores 122 adjacent charged with hydraulic liquid at all times.

Should there be a rupture in the brake conduit 109 at the right in FIGURE 8, the corresponding piston 141 will be displaced into contact with post 147 until the post end enters recess 152 and ring 149 expands to abut internal shoulder 152 and thereby latch piston 141 in the position shown in section in FIGURE 8 where it is held inoperative and cannot be displaced upwardly by spring 148 when the operator releases the brake pedal.

Figure 16:
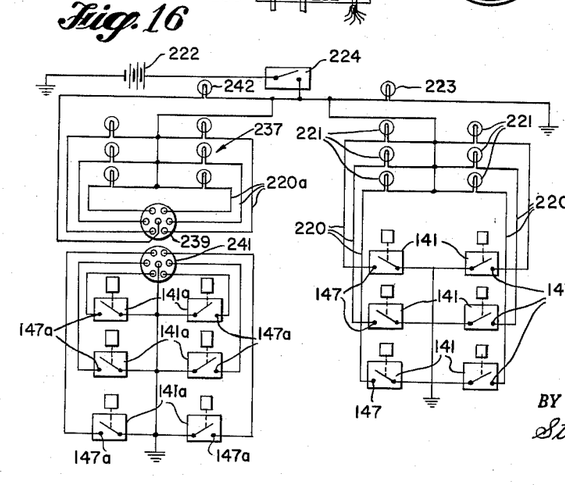

When piston 141 contacts post 147, this being shown diagrammatically in FIGURE 16 by switches, it closes an electric circuit that includes a wire 220 and a lamp 221 which is visible to the vehicle operator and signals to him that this particular brake conduit 109 is broken or leaky, or that the connected wheel cylinder has failed. The circuit shown in FIGURE 16 includes the usual vehicle battery 222 or other source of power, master signal lamp 223 and the ignition switch 224.

If the loss of fluid from the affected brake conduit 109 is due to a slow leak for example, the signal at 221 will inform the operator of this condition before the latched position 141 at the right in FIGURE 8 is attained. Then the operator may at least temporarily recondition the system from his seat at the wheel, starting with operation of handle 206 to open valve 205. This connects reservoir air pressure through conduit 204 to cylinder 202 whereby the spool valve is displaced to the FIGURE 12 position wherein air inlet 105 is connected through annular valve passage 217 to housing passage 218 and cylinder 161, cylinder air space 136 is connected through passage 216 to exhaust at 213, and annular valve passage 186 interconnects liquid discharge conduits 185 and 115. The spring 128 will fully expand at this time to displace actuator piston 124 to its FIGURE 12 position, and as it moves upward further liquid will be drawn into space 133 through conduit 112 and passage 137 to keep space 133 filled with liquid.

Now, when the operator steps on the brake pedal actuator piston 124 will be inactive, and air pressure acting through passage 218 into cylinder 161 will displace piston 162 to the FIGURE 12 position wherein it displaces liquid from space 154 past check valves 159 and through ports 158 into the liquid space 150. Pistons 141 by this time have been displaced upwardly in their bores toward abutment rings 144 by expanding springs 148, and if any space 150 and its connected conduit 109 is not filled with hydraulic brake liquid at the time such will be fully replenished by the liquid entering through ports 158. The pressure of this liquid will tend to displace pistons 141 fully upwardly so that the spaces 150 will be completely filled.

Liquid displaced from the upper ends of bores 122 and space 133 will be freely permitted to displace, during this reconditioning operation through passage 183 and return conduits 184 and 115.

Should the liquid in space 133 become so hot as to tend to expand at a time when the brakes are inactive and piston 124 is at the top of its stroke in FIGURE 8, relief means is provided to bleed off the excess liquid. This is accomplished by the increased pressure of the expanding liquid acting through conduit 188 (FIGURE 14) to displace valve 194 to the FIGURE 15 position wherein conduit 188 is connected to return conduit 114 so that excess liquid flows back to the reservoir. This is possible, of course, only when no air pressure exists in actuator cylinder space 136 resisting displacement of valve 194, and that pressure acts immediately when the brake pedal is depressed (FIGURE 8 condition) to shift valve 194 to the FIGURE 14 position where it blocks conduit 114.

Referring now to FIGURE 7, it will be noted that a branch conduit 230 extends from actuator air outlet conduit 105 to a detachable coupling assembly 231 where it is coupled to a conduit 232 leading to a distribution device like that at 106 but mounted on the trailer (not shown). Similarly a reconditioning selector valve 233 is operated by handle 234 to admit air under pressure from conduit 102 to a conduit 235 leading to coupling 231 where it is coupled to trailer mounted conduit 236 which leads to the distribution device on the trailer. Also a set of six signal lamps 237 is connected by six wires extending through a conduit 238 leading to a plug connector 234 for detachable connection at 241 to the distribution device in the same manner as shown at the right side of FIGURE 16. The trailer circuit also contains a master signal lamp 242 visible to the driver. Components of the trailer circuit containing lamps 237 and 242 corresponding to those in the circuit for the tractor have like reference numerals suffixed by the letter $a$.

Thus when the pedal 101 is operated to actuate the tractor brakes as heretofore described it similarly actuates the trailer brake system wherein the distribution device and conduits to the wheel cylinders are the same as shown for the tractor in FIGURE 7. Merely coupling the conduits at 231 activates the trailer brake system.

In both of the foregoing embodiments illustrated in FIGURES 1–6 and FIGURES 7–16 respectively, it is evident that valves 20 and 187 are operative, when positioned to bypass pressurized fluid to the brake actuating conduits, to vent fluid pressure in their associated pressure distribution chambers 34 and 133 to a low pressure fluid receiver. This low pressure receiver in the case of the embodiment of FIGURES 1–6 constitutes part of the master cylinder assembly 8 and in the case of the embodiment of FIGURES 7–16 constitutes reservoir 111. Thus, when foot pedal 4 or 10 is depressed to replenish the fluid supply in brake conduits 2 and 109 respectively, the brake conduits 2 and 109 and associated passageways in each distribution device can be completely filled since the isolating pistons 50 and 141, respectively, will be displaced by the fluid pressure entering the brake conduits to their positions nearest their respective distribution chambers.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. In a fluid pressure brake system having a plurality of separate fluid pressure actuated wheel brake units, a plurality of separate fluid pressure actuating circuits connected one to each of said units, fluid circuit means containing a pressure distribution chamber, a plurality of fluid barrier elements operatively interposed between said pressure distribution chamber and said actuating circuits for individually transmitting pressure of fluid in said distribution chamber simultaneously to fluid in said actuating circuits, means including a pressurizing unit selectively actuatable to apply pressure to fluid in said chamber, a low pressure fluid reservoir connected in said circuit means, recharging means for selectively bypassing all of barrier elements to supply said actuating circuits with fluid furnished from said reservoir and under pressure from actuation of said pressurizing unit, said recharging means comprising passages connecting said reservoir with each of said actuating circuits, check valves in said passages preventing flow of fluid from said actuating circuits into said reservoir, means blocking pressurization of distribution chamber fluid by said pressurizing unit and venting fluid pressure in said chamber to said reservoir, whenever said barrier elements are bypassed with fluid supplied by said recharging means to said actuating circuits, said barrier elements each comprising a plunger slidable in a bore that is open at one end to said chamber and at the other end to one of said actuating circuits, and means for releasably latching a plunger that has been displaced a predetermined distance in one direction along its bore, said plunger in latched position blocking the associated passage providing fluid communication between said low pressure reservoir and the associated actuating circuit.

2. In a fluid pressure brake system having a plurality of separate fluid pressure actuated wheel brake units, a plurality of fluid brake actuating conduits connected one to each of said brake actuating units, means providing a plurality of bores, a fluid barrier element slidable in each of said bores and longitudinally separating each of said bores into first and second compartments, means connecting said first compartments to respective ones of said brake actuating conduits, a piston cylinder portion, a piston member slidable in said cylinder portion and longitudinally separating said cylinder portion into first and second fluid pressure chambers with said first chamber being disposed in fluid communication with said second compartments and means for selectively pressurizing fluid in said second chamber or for bypassing said first chamber and said barrier elements to supply pressurized fluid to said brake actuating conduits comprising a selectively actuatable fluid pressurizing unit having an output conduit, input fluid passage means connected to said second chamber, a low pressure fluid reservoir connected to supply unpressurized fluid to said first chamber, bypass fluid passage means connected to said reservoir for supplying fluid to said brake actuating conduits, fluid pressure relief passage means connected to said first chamber, a pressurizing member actuatable to pressurize fluid in said bypass passage means, and valve means selectively actuatable to one of a plurality of operational positions, said valve means being disposed to connect said output conduit to said input fluid passage means and to block fluid flow through said bypass fluid passage means and said relief passage means in one of said operational positions and to connect said pressurizing unit for actuating said pressurizing member while connecting said relief passage means to said reservoir and blocking passage of fluid through said inlet passage means in another of said operational positions.

3. In a fluid pressure control system having a plurality of fluid pressure actuated units, separate fluid conduits connected one to each of said units, a casing having a plurality of independent bores, a fluid barrier element slidable in each bore and separating each bore into longitudinally spaced first and second fluid compartments, means connecting said first compartments to respective ones of said conduits, a cylinder portion formed in said casing, a piston member movable in said cylinder portion and longitudinally separating said cylinder portion into first and second chambers with said first chamber opening into said second compartments, a fluid pressurizing unit, conduit means connecting said pressurizing unit to said second chamber, means for selectively actuating said pressurizing unit, a reservoir connected to introduce unpressurized fluid into said first chamber, fluid bypass passage means connecting said conduits to said reservoir, pressure relief passage means connecting said first chamber to said reservoir, fluid pressure cylinder means in fluid communication with said bypass fluid passage means, a pressurizing member in said cylinder means and being actuatable to pressurize fluid in said bypass fluid passage means, a selector valve operatively associated with cylinder means, said pressure relief passage means and said conduit means, said valve being operable in one position to block fluid flow through said pressure relief passage means while permitting transmittal of fluid through said conduit means and being operable in another position to connect said pressurizing unit to said cylinder means while blocking fluid flow through said conduit means and permitting transmittal of fluid through said pressure relief passage means.

4. The fluid pressure control circuit defined in claim 3 comprising further fluid passage means connecting said first chamber to said reservoir and means responsive to pressure in said second chamber for blocking and permitting transmittal of fluid through said further fluid passage means.

5. In a fluid pressure control system, a casing containing a plurality of independent bores all open to a common pressure chamber at one end, an input line connected to supply fluid under pressure into said chamber, individual output conduits connected to the other ends of said bores, a barrier piston slidable in each bore and spring biased toward said chamber, means for latching each of said pistons when it has moved a predetermined distance toward said other end of its bore, means defining a bypass chamber in said casing, valve means for disconnecting and connecting said input line from said pressure chamber and connecting said input line to said bypass chamber, check valves interposed between said bypass chamber and said other ends of each of said bores for permitting pressure developed in said bypass chamber to enter said bores but blocking return to said bypass chamber, means providing an adjustable selector valve in said input line, a pressure return line connected into said selector valve and blocked when said valve is adjusted to introduce input pressure into said pressure chamber, and means for adjusting said valve to disconnect said input line from said pressure chamber, connect said input line to said bypass chamber and connect said pressure chamber to said return line.

References Cited by the Examiner

UNITED STATES PATENTS

| | | | |
|---|---|---|---|
| 2,121,653 | 6/38 | Davis | 303—84 X |
| 2,451,828 | 10/48 | Harriatt | 303—84 |
| 2,501,800 | 3/50 | Wales | 303—84 X |
| 2,824,627 | 2/58 | Winter | 303—84 |

FOREIGN PATENTS

| | | |
|---|---|---|
| 482,796 | 4/38 | Great Britain. |
| 576,673 | 5/33 | Germany. |

EUGENE G. BOTZ, *Primary Examiner.*

ARTHUR L. LA POINT, *Examiner.*